United States Patent Office 3,297,515

Patented Jan. 10, 1967

3,297,515

LAMINATED PRODUCTS AND A PROCESS FOR THE PRODUCTION THEREOF

Joseph Regenstein, Jr., Chicago, and John C. Tapas, Glenview, Ill., assignors to Velsicol Chemical Corporation, Chicago, Ill., a corporation of Illinois No Drawing. Filed Aug. 27, 1965, Ser. No. 483,353
9 Claims. (Cl. 161—250)

This application is a continuation-in-part of our copending application Serial No. 82,734, filed January 16, 1961 and now abandoned.

This invention relates to new laminated products and a process for their production.

More particularly, this invention relates to the production of laminated products comprising a plurality of plies of adhesively bonded sheet material.

In the past several decades it has become known to laminate fibrous and other flexible sheet materials to improve their strength and resistance. Asphalt has found acceptance as a lamination adhesive for fibrous sheet material because of its availability and relatively low cost. However, the products utilizing asphalt as the lamination adhesive are often inferior in their essential properties and are therefore unsuitable for many uses. For example, when successive layers of a thin fibrous sheet material, such as kraft paper, are laminated with an asphalt based adhesive the product has low ductility, i.e., the lamination adhesive is often brittle and may crack when the laminated product is flexed, thereby limiting use as packaging material.

The defects of previously known laminated products seriously detract from their usefulness. The ductility of the laminated product is important where the product is subject to changing stresses at low and normal temperatures. Such stress may be developed by ordinary handling or shipping. The passing of moisture through the product greatly limits its usefulness where the product is used as packaging for contents that undergo physical or chemical change in the presence of moisture. Furthermore, low resistance to bleed, i.e., the flowing of the lamination adhesive under pressure through the plies of the sheet laminate material and onto or into the adjacent packaged material, is particularly undesirable where the laminated product is used as packaging material of a large number of products which would be damaged by such bleeding, such as foodstuffs, clothing, wood products, and the like.

Thus, one object of the present invention is to provide laminated sheet material having high ductility at low and normal temperatures.

Another object of the present invention is to provide laminated sheet material having a barrier to moisture and oils.

Still another object of this invention is to provide laminated products having a high order of resistance to laminant bleed.

These and other objects of the present invention will be apparent from the ensuing description.

The laminated products of the present invention can be readily prepared by interposing between two or more plies of fibrous sheet material, such as paper or paperboard, a film of molten adhesive containing as its essential constituents thermoplastic, aromatic, petroleum-derived hydrocarbon resin and plasticizing oil, and consolidating them under pressure.

The molten adhesive can be coated onto one or both of the adjacent sheet surfaces and the sheets consolidated under pressure as by rolls or platens, as is well known, to form the laminated product.

The fibrous sheet materials suitable for ply material in the laminated products of this invention are composed of natural or synthetic woven and nonwoven fibrous materials. Examples of these suitable materials are the paper and paper products produced from cotton, wood pulp, rags, asbestos, flax, kapok, or other fibers.

As a specific embodiment of the present invention one or more sheets of plastic film material may be laminated to or between the sheets of fibrous material. Examples of suitable impervious film materials are polyethylene, plasticized polyvinyl chloride, polyvinyl acetate, polyvinylidene chloride, polyvinyl chloride-polyvinyl acetate copolymers, polyvinyl chloride-polyvinylidene chloride copolymers, synthetic rubber, nylon, and the like.

Particularly preferable in view of dimensional stability are the felted cellulosic fibrous sheet materials, such as kraft paper, alpha cellulose paper, butcher's paper, bag paper, glassine paper, and the various paperboards. Kraft paper is particularly suitable in the formation of multiwall bags and sacks. Kraft paper weighing from 30 to about 60 pounds per ream is generally suitable for this use. The amount of adhesive utilized to prepare the laminated kraft paper products of the present invention may vary with the weight of the kraft paper and may be present in amounts of from about 15 to about 100 pounds per ream of paper.

The adhesive utilized in the laminated product of the present invention contains as its essential ingredients substantially nonpolymerizable, thermoplastic, aromatic, light-colored hydrocarbon resin produced by polymerization of unsaturated petroleum fractions and plasticizing oil selected from the group consisting of aromatic oil, naphthenic oil consisting essentially of a mixture of cycloparaffinic compounds, and mixtures thereof, said oils being relatively viscous.

Preferable essential ingredients of the adhesive utilized herein are: substantially nonpolymerizable, aromatic, thermoplastic, hydrocarbon resin produced by polymerization of unsaturated petroleum fractions, e.g. by polymerization of "dripolene," a commonly known liquid mixture of unsaturated hydrocarbons obtained in the high temperature pyrolysis, for example a temperature of about 1200–1800° F. for up to about 7 seconds, of normally gaseous hydrocarbons, said resin having a softening point range of from about 200 to about 300° F., a mixed aniline point of from about 20 to about 60° C., an iodine number of from about 70 to 160, an acid number of from 0 to 4, a specific gravity of 60° F. of from about 1.05 to about 1.1, a carbon to hydrogen ratio of about 9/1 and a molecular weight of from about 600 to about 1400 as determined by cryoscopic means; and oil selected from the group consisting of aromatic oil consisting essentially of a mixture of highly viscous aromatic compounds, having a viscosity of from about 100 to 400 S.S.U. at 210° F., and an aniline point of from about 20 to about 60° C.; naphthenic oil consisting essentially of a mixture of viscous cycloparaffinic compounds, having a viscosity of from about 50 to about 200 S.S.U. at 210° F., and an aniline point of from about 50 to about 150° C.; and mixtures thereof; said oils preferably being light in color and relatively viscous.

The aromaticity of a material can be determined by its aniline point or mixed aniline point. Thus at constant molecular weight the lower the aniline point or mixed aniline point, the higher the aromaticity, i.e. the aromatic content. Therefore it is understood that the resin used in the preparation of the adhesive of the present invention is prepared from a fraction containing a high amount of polymerizable aromatic monomers. This resin is unexpectedly useful in lamination adhesives due to its high compatibility with desirable rubber additives, particularly styrene-butadiene rubber.

Hydrocarbon resins of the above description and having the properties defined herein can be prepared readily from dripolene and preferably from a fraction of dripolene boiling in the range of from about 200° to about 400° F. by thermopolymerization in a closed system at a temperature of from about 400° to about 500° F. for from about 4 hours to about 2 days, followed by a catalytic polymerization in the presence of a catalytic amount of a Friedel-Crafts catalyst such as boron trifluoride at a temperature of from about 300 to about 600° F. for a period of from about one-half hour to about two days, and recovering the resin therefrom. Dripolene is obtained by high temperature pyrolysis of normally gaseous hydrocarbons containing two or more carbon atoms which are readily available as natural gases and as gases obtained in the cracking of petroleum oils. These gases are heated to a temperature of from about 1200 to about 1800° F. at superatmospheric pressure for up to about 7 seconds and then rapidly cooled to a temperature such as below about 100° F. to prevent further pyrolysis or polymerization. The liquid organic mixture obtained after cooling or after distillation of the cooled product constitutes dripolene. A fraction of this mixture boiling from about 200° F. to about 400° F. is preferably utilized as the starting material in the preparation of the resins defined herein. The dripolene or the preferred fraction is thermally and catalytically polymerized as heretofore described and then distilled to remove nonpolymerized hydrocarbons yielding a resin as described herein as the bottoms product.

The quantity of each ingredient of the adhesive is dependent upon the physical characteristics of the ingredient, the characteristics and amounts of the other ingredients, and the desired characteristics of the adhesive. The amount of oil used in the adhesive depends primarily upon the properties of the resin, as exemplified by the softening point. Generally, the higher the softening point of the resin, the higher the viscosity of the resin and the more oil needed to keep the viscosity of the adhesive at a workable level. Further, since the aromatic oils as described herein are generally of higher viscosity than the naphthenic oils herein described, a greater amount of aromatic oil would be required to lower the over-all viscosity of the adhesive than if naphthenic oil were utilized.

Aromatic and naphthenic oil ingredients of the adhesive utilized in the products of the present invention are commercially available. For example, an aromatic oil having a viscosity of about 250–270 S.S.U. at 210° F. and an aniline point of 40–50° C. is supplied by the Penola Oil Co. as WS–3267. A naphthenic oil suitable as an ingredient in the adhesive described herein, having a viscosity of 80–90 S.S.U. at 210° F. and an aniline point of about 75° C., is supplied by the Sun Oil Co. as Circosol 596.

While adhesives can be prepared from a wide range of quantities of ingredients described herein, the most suitable proportions consistent with good adhesion and other desirable properties are as follows: from about 30 to about 60 parts by weight resin as described herein, having a softening point from about 200 to about 300° F.; and from about 30 to about 60 parts by weight oil or oil mixture as described herein.

The adhesive produced as described above has a specific gravity at 25° C. of a minimum of 1.01 and a carbon to hydrogen ratio of from about 8.5/1 to about 10/1.

The adhesives usable in the present invention are preferably improved by the addition of rubber to increase the ductility of the adhesive. Small amounts of rubber are sufficient, for example from 1 to 20 parts by weight in an adhesive where the essential constituents comprise about 100 parts by weight.

An example of a suitable adhesive having a high order of ductility is an adhesive composed of from 35 to 45 parts by weight resin described herein, having a softening point from about 220 to about 260° F.; from about 45 to about 55 parts by weight aromatic oil, described herein; from about 2 to about 10 parts by weight naphthenic oil described herein; and from about 1 to about 6 parts by weight of a natural or synthetic hydrocarbon rubber such as butadiene-styrene copolymer, polyisoprene, polybutadiene, and their mixtures.

The resistance to bleed is primarliy dependent upon the softening point of the adhesive. The adhesives herein described have excellent bleed characteristics at the temperatures at which the laminated products are normally utilized. However, if the laminated product is to be used at higher temperatures, then an adhesive having a higher softening point is preferable. For example, a preferred adhesive having excellent bleed characteristics at temperatures of about 125° F. is comprised of about 50 parts by weight resin as herein described, having a softening point of from about 230 to about 260° F.; about 50 parts by weight aromatic oil described herein; and about 4 parts by weight styrene-butadiene rubber.

The adhesive utilized in the products of the present invention can be readily prepared by blending a heated mixture of the synthetic thermoplastic hydrocarbon resin and an oil selected from the group consisting of aromatic oil, naphthenic oil, and mixtures thereof, preferably in an aromatic solvent which is later removed. As previously stated, small amounts of rubber can be added to improve the ductility of the adhesive. The rubber additives are most easily usable in the form of crumbs, pellets, beads, etc., to facilitate dissolution into the solvent and/or oil solution.

Thus, for example, the resin comprising about 30 to about 60 parts by weight of the adhesive is added to the previously specified plasticizing oil comprising 30 to 60 parts by weight of the adhesive, and heated with stirring until the resin is dissolved. The preparation can also be readily carried out in a convenient quantity of aromatic solvent at lower blending temperatures. The amount of solvent is not critical, and an example of a convenient quantity of solvent is an amount of aromatic solvent equal in weight to the weight of the resin and oil mixture of a solvent, such as benzene, toluene, xylene, or any mixture of these or any other aromatic solvents.

If the adhesive is prepared without a solvent, the plasticizing oil is heated to a temperature of between about 200° and 320° F., and the rubber, if used, and resin blended therein, preferably under a blanket of inert gas, such as carbon dioxide or nitrogen.

If a solvent is used, the plasticizing oil can be added to the solvent before or at the same time the synthetic hydrocarbon resin is added. The addition is conveniently performed at atmospheric pressure and at a temperature of between about 100° and 260° F. with vigorous stirring until the resin has dissolved into the solution. To improve the ductility of the adhesive, it is preferred to add from about 1 to about 10 parts by weight of a hydrocarbon rubber as aforesaid to the solvent before the resin and oils are added. The rubber is added to the solvent at a solvent temperature of 100–260° F. and stirred for several hours until the viscosity of the rubber-solvent solution remains constant.

After the resin and oil have been added and dissolved into solution, the solvent or solvent mixture is removed by stripping in vacuo or by any other solvent removing process. The stripping is readily performed at atmospheric pressure at the boiling point of the solvent or solvent mixture or at lower temperatures if reduced pressure is used.

The resulting adhesive has properties superior to asphalt adhesives and has the added advantage of being capable of imparting a relatively light color to the laminated product. The adhesive can also be pigmented to impart any desired color to the adhesive, which will color the laminated product to a degree dependent upon the thickness and type of dimensionally stable material utilized. For example, when a brightly pigmented adhesive is used with thin sheets of white paper, the laminated product will appear to have a color approaching the color of the pigmented adhesive, while this same adhesive when utilized with thicker paperboard sheets has little or no effect on the color of the laminated product.

The adhesive utilized herein can be improved by the addition of inert fillers and fortifying agents. The addition of an inert filler serves to improve certain properties of the adhesive, such as improved water resistance. Among the inert fillers which are suitable are glass, asbestos, wood flour, cellulose, and the mineral clays. A specific example of the types of suitable mineral clays are the kaolinite clays. The fillers may comprise from about 1 to about 30% by weight of the adhesive.

The addition of a fortifying agent serves to improve the ductility and raise the softening point of the adhesive. Suitable fortifying agents are high melting resins, such as polystyrene resin and polyethylene resin.

The following examples will illustrate the preparation of the aforementioned adhesive and the method of preparing the laminated products of the present invention.

*Example 1*

Crumb styrene-butadiene rubber (28 gm.) was added to benzene (approximately 570 gm.) and the mixture was heated and stirred for about 10 hours at a temperature of from 110 to 140° F. Samples were checked for viscosity at hourly intervals until the viscosity remained constant during several checks. The viscosity of this mixture remained constant after 10 hours. Aromatic oil (350 gm.) having a viscosity of 250–270 S.S.U. at 210° F. and an aniline point of 40–50° C., and aliphatic napthenic oil (42 gm.) having a viscosity of 80–90 S.S.U. at 210° F. and an aniline point of 75° C., were added to the hot solvent mixture and the resulting mixture stirred for a period of approximately ½ hour until the oils were dissolved. At the end of this period, crushed synthetic hydrocarbon resin, softening point 235–245° F. (280 gm.) having the properties and being prepared as heretofore described for the preferable essential resin ingredient, was added and the stirring continued for 1 to 2 hours until the resin dissolved into solution. The benzene solvent was removed from the solution by heating in vacuo and collected for reuse.

The adhesive thus produced had the following properties:

| | |
|---|---|
| Viscosity,[1] S.S.U. at 275° F., sec. | 280 |
| Flash point (Cleveland Open Cup), ° F. | 485 |
| Ductility,[2] at 77° F., pull out rate 5 cm./min. | 150+ |
| Softening point,[3] ° F. | 119 |
| Specific gravity, at 60° F. | 1.02 |
| Carbon to hydrogen ratio | 9/1 |

[1] Viscosity, as measured by ASTM method E–102–57.
[2] Ductility, as measured by ASTM method D–113–44.
[3] Softening point, as measured by ball and ring method.

Adhesive prepared as above was heated to 200° F., and while molten was applied as a 3 mil, approximately 50 pounds per ream coating to a sheet of 40 pounds per ream kraft paper by doctor blade application. A second sheet of 40 pounds per ream kraft paper was placed onto the coated planar side of the first sheet and the combination was passed through calender rolls heated to 180° F. The rolls exerted only slight pressure, in the order of 2–3 pounds per lineal foot of roll. The laminated product thus produced had excellent lamination properties, especially ductility.

A laminated 30 pound per ream kraft paper product was also produced by the method of the present invention utilizing clay as a filler with the adhesive of this example, such that 15% by weight of the adhesive was replaced by the filler. This product had better bleed resistance than the unfilled product.

*Example 2*

Crumb styrene-butadiene rubber (56 gms.); aromatic oil (252 gms.) having the following properties: viscosity of 250–270 S.S.U. at 210° F. and an aniline point of 40–50° C.; and napthenic oil (252 gms.) having the following properties: viscosity of 80–90 S.S.U. at 210° F. and an aniline point of 75° C., were blended by stirring and heating under a blanket of nitrogen gas to a temperature of approximately 220–240° F. over a period of 16 hours. At the end of this period, crushed synthetic thermoplastic hydrocarbon resin described in Example 1 (840 gms.), softening point 235–245° F. was added, the stirring continued for 1 to 2 hours, and the temperature raised to 300° F. until the resin was dissolved. The adhesive thus produced had a softening point of 148° F., as determined by the ball and ring method.

The adhesive was heated to 200° F., and while molten was applied as a 3 mil, approximately 50 pounds per ream coating to kraft paper, which was made into a laminate as described in the previous example. The laminated product thus produced had excellent properties, such as high ductility, a waterproofness of between about 10 and about 24 hours as determined by the TAPPI method T433 m–44 using a paraffin seal, and no bleed after 24 hours at 100° F. as determined by a modified TAPPI method T475 m–50, wherein 4 inch squares were used with a 5 pound weight instead of as suggested in the said TAPPI method.

*Example 3*

Crumb styrene-butadiene rubber (56 gms.), and aromatic oil (672 gms.) having a viscosity of 250–270 S.S.U. at 210° F. and an aniline point of 40–50° C. were blended by stirring and heating under a blanket of nitrogen gas to a temperature of approximately 220–240° F. over a period of 16 hours. At the end of this period, crushed synthetic thermoplastic hydrocarbon resin described in Example 1 (672 gms.), softening point 235–245° F. was added, the stirring continued for 1 to 2 hours, and the temperature raised to 300° F. until the resin was dissolved. The adhesive thus produced had the following physical properties:

| | |
|---|---|
| Softening point (ball and ring), ° F. | 137 |
| Viscosity,[1] S.S.U. at 275° F. | 330+ |
| Ductility,[2] 77° F., 5 cm./min., cm. | 150+ |
| Flash point (Cleveland Open Cup), ° F. | 460 |
| Specific gravity, at 60° F. | 1.02 |
| Carbon to hydrogen ratio | 9/1 |

[1] Viscosity, as measured by ASTM method E–102–57.
[2] Ductility, as measured by ASTM method D–113–44.

The adhesive thus produced was coated in a molten state by doctor blade application onto a sheet of approximately 40 pounds per ream kraft paper as a 3 mil, approximately 50 pounds per ream coating. A second sheet of kraft paper was placed onto the coated side of the first and the combination was passed through calender rolls heated to 180° F. The laminated product thereby produced has excellent lamination properties, including no bleed after 17 hours at 100° F.

An additional 40 pound per ream kraft paper laminated product was prepared using only 19.6 pounds of the adhesive prepared in the present example per ream, its waterproofness was measured by the method described in the previous example, and found to be about 10 hours. Laminated products were also produced utilizing clay as a filler for the adhesive, where the adhesive was coated up to 15 pounds per ream. The product had excellent lamination properties, including improved bleed resistance and waterproofness, such that the product did not fail after 36 hours of the previously described waterproofness test.

*Example 4*

Crumb styrene-butadiene rubber (84 gms.), aromatic oil (231 gms.) having a viscosity of 250–270 S.S.U. at 210° F. and an aniline point of 80–90° C., and aliphatic naphthenic oil (231 gms.) having a viscosity of 80–90

S.S.U. at 210° F. and an aniline point of 75° C., were blended by stirring and heating to approximately 220–240° F. over a period of 16 hours under a blanket of nitrogen gas. At the end of this period, crushed synthetic thermoplastic hydrocarbon resin described in Example 1 (840 gms.), softening point 235–245° F. and crushed polystyrene resin (14 gms.), softening point approximately 330° F., were added, the stirring continued for 1 to 2 hours, and the temperature raised to 380° F. until the resin was dissolved. The adhesive thus produced had a softening point of 147° F., as determined by the ball and ring method.

The adhesive was heated until molten, and was coated by doctor blade application onto a sheet of approximately 40 pounds per ream kraft paper as a 3 mil, approximately 50 pounds per ream coating. A second sheet of kraft paper was placed onto the coated side of the first and the combination was passed through calender rolls heated to 180° F. The calender rolls exert a pressure of only 2 or 3 pounds per lineal foot of roll. The laminated product thereby produced has excellent lamination properties, including high ductility and waterproofness.

*Example 5*

Crumb polyisoprene rubber (28 gms.) and aromatic oil (352 gms.) having a viscosity of 390 S.S.U. at 210° F., are blended by stirring and heating under a blanket of nitrogen gas to a temperature of approximately 220–260° F. over a period of 16 hours. At the end of this period, crushed synthetic thermoplastic hydrocarbon resin (320 gms.), softening point 200° F., having the properties and prepared as heretofore described, is added and the stirring continued for about 2 hours at a temperature of 200–240° F. until the resin dissolves into solution. The resulting solution is an adhesive as described herein useful in the production of the laminated products of the present invention.

*Example 6*

Crumb styrene-butadiene rubber (28 gms.) and aromatic oil (386 gms.) having a viscosity of 200 S.S.U. at 210° F. are blended by stirring and heating under a blanket of nitrogen gas to a temperature of approximately 220–260° F. over a period of 16 hours. At the end of this period, crushed synthetic thermoplastic hydrocarbon resin (286 gms.), softening point 300° F., having the properties and prepared as heretofore described, is added and the stirring continued for about 2 hours at a temperature of 300–320° F. until the resin dissolves into solution. The resulting solution is an adhesive as described herein useful in the production of the laminated products of the present invention.

*Example 7*

Crushed synthetic thermoplastic hydrocarbon resin (294 gms.), softening point 240 to 255° F., having the properties and prepared as heretofore described, is added to aromatic oil (370 gms.) having a viscosity of 250–270 S.S.U. at 270° F., and an aniline point of 40–50° C., and naphthenic oil (36 gms.) having a viscosity of 80–90 S.S.U. at 210° F. and an aniline point of 75° C. The resulting mixture is heated and stirred for about 2 hours at a temperature of 250–300° F. The heating and stirring is stopped when all the components have dissolved into solution. The resulting solution is useful as an adhesive in producing the laminated products of the present invention.

The laminated products of the present invention are extremely valuable in the production of such objects as multiwall paper bags, multiwall shipping sacks, and decorative panels. Multiwall bags and sacks usually consist of two or more sheets of 30 to 60 pounds per ream kraft paper laminated with a suitable adhesive. The laminated products of the present invention form superior multiwall bags and sacks having higher ductility than the previously used asphalt laminated products. Furthermore, the products of the present invention can be further improved, and such improvement is an embodiment of this invention, by laminating one or more sheets of impervious flexible film, such as polyethylene film, to or between the sheets of fibrous material. Multiwall sacks and bags formed from the thusly improved laminated products of the present invention having improved flexibility, strength, and moistureproofness.

The products of the present invention are also valuable in the formation of decorative laminates due to the relatively light colored adhesive utilized in the laminated products. In forming decorative laminates, a core comprising a plurality of plies of paper coated, and if desired impregnated, with the resin described herein, is consolidated between the platens of a press with a sheet of decorative surface material, such as paper, textile, fiberglass, plastics such as nylon, vinyls, and the like. The light color of the adhesive utilized herein also permits the use of thinner sheets of decorative material, providing a saving in the amount of decorative material without a loss in the color and strength of the decorative laminate.

We claim:

1. A laminate comprising a plurality of plies of sheet material bonded by interposed adhesive containing as its essential constituents substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to 160, an acid number of from 0 to about 4, a specific gravity at 60° F. of from about 1.05 to about 1.1, a carbon to hydrogen ratio of about 9/1, and a molecular weight of from about 600 to about 1400 as determined by cryoscopic means; and a plasticizing oil selected from the group consisting of aromatic oil having an aniline point of from about 20 to about 60° C., naphthenic oil having an aniline point of from about 50 to about 150° C., and mixtures thereof.

2. A laminate comprising a plurality of plies of fibrous sheet material bonded together by interposed adhesive containing as its essential constituents from about 30 to about 60 parts by weight substantially completely polymerized, aromatic, thermoplastic hydrocarbon resin produced by polymerization of unsaturated petroleum fractions, having a softening point range of from about 200 to about 300° F., a mixed aniline point of from about 20 to about 60° C., an iodine number of from about 70 to 160, an acid number of from 0 to about 4, a specific gravity at 60° F. of from about 1.05 to about 1.1, a carbon to hydrogen ratio of about 9/1, and a molecular weight of from about 600 to about 1400 as determined by cryoscopic means; and from about 30 to about 60 parts by weight viscous oil selected from the group consisting of aromatic oil having an aniline point of from about 20 to about 60° C., naphthenic oil consisting essentially of viscous cyclic hydrocarbon compounds, having an aniline point of from about 50 to about 150° C., and mixtures thereof.

3. A laminate comprising a plurality of plies of fibrous sheet material bonded together by interposed adhesive containing as its essential constituents from about 1 to about 20 parts by weight of a hydrocarbon rubber; from about 30 to about 60 parts by weight substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to 160, an acid number of from 0 to about 4, a specific gravity at 60° F. of from about 1.05 to about 1.1, a carbon to hydrogen ratio of about 9/1, and a molecular weight of from about 600 to about 1400 as determined by cryoscopic means; and from about 30 to about 60 parts by weight viscous oil selected from the group consisting of aromatic oil having an aniline point of from about 20 to about 60°

C., naphthenic oil consisting essentially of viscous cyclic hydrocarbon compounds, having an aniline point of from about 50 to about 150° C., and mixtures thereof.

4. A laminate comprising a plurality of plies of fibrous sheet material bonded together by interposed adhesive containing as its essential constituents from about 30 to about 60 parts by weight substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to about 160, an acid number of from 0 to about 4, a specific gravity at 60° F. of from about 1.05 to about 1.1, a carbon to hydrogen ratio of about 9/1, and a molecular weight of from about 600 to about 1400 as determined by cryoscopic means; and from about 30 to about 60 parts by weight oil selected from the group consisting of aromatic oil having a viscosity of from about 200 to about 400 S.S.U. at 210° F., and an aniline point of from about 20 to about 60° C., naphthenic oil consisting essentially of a mixture of viscous cyclic hydrocarbons, having a viscosity of from about 50 to about 200 S.S.U. at 210° F., and an aniline point of from about 50 to about 150° C., and mixtures thereof.

5. A laminate comprising a plurality of plies of normally dimensionally stable fibrous sheet material bonded together by interposed adhesive containing as its essential constituents from about 1 to about 10 parts by weight of a hydrocarbon rubber; from about 30 to about 60 parts by weight substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to about 160, an acid number of from 0 to about 4, a specific gravity at 60° F. of from about 1.05 to about 1.1, a carbon to hydrogen ratio of about 9/1, and a molecular weight of from about 600 to about 1400 as determined by cryoscopic means; and from about 30 to about 60 parts by weight oil selected from the group consisting of aromatic oil having a viscosity of from about 200 to about 400 S.S.U. at 210° F., and an aniline point of from about 20 to about 60° C., naphthenic oil consisting essentially of a mixture of viscous cyclic hydrocarbons, having a viscosity of from about 50 to about 200 S.S.U. at 210° F., and an aniline point of from about 50 to about 150° C., and mixtures thereof.

6. A laminate comprising at least one ply of fibrous sheet material and at least one ply of plastic film material bonded together by interposed adhesive containing as its essential constituents substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to about 160, an acid number of from 0 to about 4, a specific gravity at 60° F. of from about 1.05 to about 1.1, a carbon to hydrogen ratio of about 9/1, and a molecular weight of from 600 to about 1400 as determined by cryoscopic means; and a plasticizing oil selected from the group consisting of aromatic oil having an aniline point of from about 20 to about 60° C., naphthenic oil consisting essentially of viscous cyclic hydrocarbon compounds having an aniline point of from about 50 to 150° C., and mixtures thereof.

7. A laminate comprising a plurality of sheets of paperboard bonded together by interposed adhesive containing as its essential constituents substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to about 160, an acid number of from 0 to about 4, a specific gravity at 60° F. of from about 1.05 to about 1.1, a carbon to hydrogen ratio of about 9/1, and a molecular weight of from 600 to about 1400 as determined by cryoscopic means; and plasticizing oil selected from the group consisting of aromatic oil having an aniline point of from about 20 to about 60° C., naphthenic oil consisting essentially of viscous cyclic hydrocarbon compounds having an aniline point of from about 50 to 150° C., and mixtures thereof.

8. A laminated product comprising a plurality of plies of kraft paper bonded together by interposed adhesive containing as its essential consistuents substantially completely polymerized, aromatic, thermoplastic, hydrocarbon resin produced by polymerization of unsaturated petroleum fractions, having a softening point range of from about 200 to about 300° F., a mixed aniline point of from about 20 to about 60° C., an iodine number of from about 70 to about 160, an acid number of from 0 to about 4, a specific gravity at 60° F. of from about 1.05 to about 1.1, a carbon to hydrogen ratio of about 9/1, and a molecular weight of from 600 to about 1400 as determined by cryoscopic means; and a plasticizing oil selected from the group consisting of aromatic oil having an aniline point of from about 20 to about 60° C., naphthenic oil consisting essentially of viscous cyclic hydrocarbon compounds having an aniline point of from about 50 to 150° C., and mixtures thereof.

9. The product of claim 6 wherein the fibrous material is kraft paper and the plastic material is polyethylene film.

References Cited by the Examiner

UNITED STATES PATENTS

| | | | |
|---|---|---|---|
| 2,792,326 | 5/1957 | Doule et al. | 156—283 |
| 2,868,685 | 1/1959 | Downs et al. | 156—315 |
| 3,070,570 | 12/1962 | Gessler et al. | 260—887 |

MORRIS SUSSMAN, *Primary Examiner.*

W. J. VAN BALEN, *Assistant Examiner.*